United States Patent [19]

Sellars et al.

[11] 3,956,206

[45] May 11, 1976

[54] PAINTS FROM TWO OR MORE DIFFERENTLY COLOURED AQUEOUS FILM-FORMING POLYMER EMULSIONS

[76] Inventors: Keith Sellars, 39 Avenue Road, Farnborough, Hampshire; Peter Laybourn, 14 Coney Gree, Sawbridgeworth, Hertfordshire; Leslie Chandler, 19 Gilders, Sawbridgeworth, Hertfordshire, all of England

[22] Filed: July 14, 1971

[21] Appl. No.: 162,719

Related U.S. Application Data

[63] Continuation-in-part of Ser. No. 834,875, June 19, 1969, abandoned.

[30] Foreign Application Priority Data

June 25, 1968 United Kingdom............... 30272/68

[52] U.S. Cl.................... 260/17 R; 260/29.6 RW; 260/29.6 WA; 260/42.51; 260/29.7 WA
[51] Int. Cl.².................... C09D 3/48; C09D 5/29
[58] Field of Search............. 260/17 RR, 29.6 RW, 260/29.6 WA, 29.6 B, 29.6 H, 29.6 TA, 41 A, 41 B, 42.51

[56] References Cited
UNITED STATES PATENTS

3,185,653   5/1965   Knudsen .................. 260/29.6 H
3,458,328   7/1969   Zola ....................... 260/17 R

*Primary Examiner*—Lucille M. Phynes
*Attorney, Agent, or Firm*—Brisebois & Kruger

[57] ABSTRACT

A process for the production of a multicoloured paint which comprises admixing two or more differently coloured aqueous polymer emulsions, each containing polyvinyl alcohol as a protective colloid, with an aqueous solution of borax to form a multicoloured paint dispersion consisting of discrete coloured aqueous polymer emulsion particles as the disperse phases in an aqueous continuous phase of the borax solution, a clay of the formula

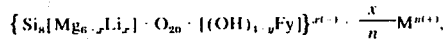

wherein M is a cation, $x$ is a value greater than zero and less than 6, $y$ is from 1.00 up to but less than 4 and $n$ is an integer from 1 to 3, being incorporated into the continuous phase to stabilize the paint produced.

13 Claims, No Drawings

PAINTS FROM TWO OR MORE DIFFERENTLY COLOURED AQUEOUS FILM-FORMING POLYMER EMULSIONS

This application is a Continuation-in-Part of our copending application Ser. No. 834,875, filed 19 June, 1969, now abandoned.

This invention relates to paints, especially multicoloured paints.

Multicoloured paints, generally comprising two or more colours, are already commercially available Hitherto proposed multicoloured paints have been made by dispersing nitrocellulose lacquers or other organic solvent based lacquers in water dispersible colloid solutions of, for example, methyl cellulose or by dispersing water-based paints in solvent-based solutions or dispersions. The lacquers contain hydrophobic solvents, for example, alkyl acetates and ketones, and the coloured phases are thus kept separate and the paints dry to give multicolour films.

Being based on volatile organic solvents, however, the hitherto proposed multicoloured paints have a number of serious disadvantages. First of all, they have a low flash point and are subject to the safety regulations applicable to cellulose materials, which impose severe restrictions on their carriage, storage and use. Secondly, they have an unpleasant smell which can remain for several days after painting.

It is an object of the present invention to avoid the above disadvantages and to provide useful multicoloured paints based solely on aqueous film-forming polymer emulsions.

It is a further object of the present invention to provide a process for the production of a multicoloured paint which comprises causing at least two differently coloured or pigmented aqueous film-forming polymer emulsions to gel and, if necessary, comminuting the coloured or pigmented gels so formed, to produce a dispersion.

Another object of the present invention is to provide a process for the production of a multicoloured paint, which comprises mixing at least two aqueous film-forming polymer emulsions stabilized by a protective colloid with an aqueous solution of a substance which will react with the emulsions causing them to gel, and, if necessary, comminuting the gel so formed, thus producing an aqueous dispersion containing particles derived from the coloured emulsions as the disperse phases.

Working within the concept of an all-aqueous multicoloured paint we have found that the interaction between polyvinyl alcohol and gelling amounts of borax can be utilized to obtain multicoloured coatings of outstanding definition as regards the individual colours even after long storage periods. Outstanding storage stability and, to some extent, improved definition, is obtained by the incorporation into the continuous phase of stabilizing amounts of a clay of the formula

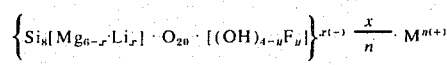

in which M is a cation, $x$ is a value greater than zero and less than 6, $y$ is from 1.0 up to but less than 4 and $n$ is an integer from 1 to 3.

Clays of the above formula are described in British Patents Nos. 1,054,111 and 1,155,595. They are synthetic swelling, generally hydrophilic, clays having the form of freeflowing white powders. They are commercially available from Laporte Industries Limited under the trade name LAPONITE. M is preferably sodium in which case $n$ is equal to 1. The clay dispersion sold as LAPONITE S is especially preferred for use in the present invention. This has the specific dry weight analysis: $SiO_2$ 55.9%, $MgO$ 26.7%, $Li_2O$ 1.9%, F 8.3%, $Na_2O$ 4.3%, $Fe_2O_3$ 0.04%, $CaO$ 0.10%, $SO_3$ 0.05%, $CO_2$ 0.24%, structural $H_2O$ 3.6%.

The clay dispersion advantageously contains one or more wetting agents, especially anionic polyphosphate surfactants such as "Calgon" and "Tetron" which reduce the viscosity of the dispersion and reduce the tendency of the dispersion to thicken and set on standing.

For convenience only the aqueous vehicle containing the clay and which forms the continuous phase in the final paint is referred to throughout this specification as a dispersion. However, this is not intended to imply that the vehicle has any particular physical structure. Other terms, e.g. solution or sol, may in some cases be a more accurate physical description.

In one form of process according to the present invention a homogeneous thickener solution is prepared by stirring together an aqueous solution of borax, a cellulose ether, for example methyl cellulose or hydroxyethyl cellulose, and at least part of the clay which is to be incorporated until a homogeneous thickener solution is obtained. A monocoloured polyvinyl alcohol-containing polymer emulsion, which may have been reduced with water to a pourable consistency, is then added slowly to the borax-containing thickener solution. As the emulsion enters the thickener solution the polyvinyl alcohol is gelled by the borax. A stirrer is generally provided which breaks the gelled emulsion into smaller particles until a satisfactory dispersion is obtained. It may, however, be advantageous to spray the polyvinyl alcohol stabilized emulsion into the thickener solution so that smaller gel particles are formed immediately. By adding two or more different coloured emulsions to the thickener solution as described above a multicolour dispersion is obtained. At this stage there is added any further clay which is to be incorporated. This dispersion may be applied by spraying onto a surface where it will dry by loss of water to give a continuous multicolour film.

To avoid bleeding of colour from the gelled particles into the thickener solution it has proved advantageous to compound the emulsion by first dispersing the dry coloured pigment in a plasticizer, for example, dibutyl phthalate, and then plasticizing the emulsion in the usual way. It has proved even more advantageous to disperse titanium dioxide in the plasticizer, for example, dibutyl phthalate, then to plasticize the emulsion and then to tint the white $TiO_2$ base to the required shade by adding a water dispersible pigment, for example a non-ionic Colanyl dyestuff, or especially a pigment containing a cationic surfactant (as described in British Patent Application No. 49366/68 filed 17 Oct., 1968, Inventors: K. Sellars, P. Laybourn and C. Bondy) to the plasticized emulsion.

As an alternative to adding the emulsion to borax solution it is also possible to add boric acid to acidic emulsions and then pour the resultant mixture into an alkaline solution maintaining the pH above 7 at all times.

By using a large proportion of a gelled dispersion pigmented with a first colour and a relatively small proportion of a gelled dispersion pigmented with a second colour it is possible to obtain a paint which on drying will produce a continuous background of the first colour flecked with the second colour. It should be noted that the background is itself formed from small gel particles of the predominant colour.

It will be appreciated that the amounts of the various constituents of the multicoloured paint dispersions may be broadly varied within the framework of the present invention depending on the specific materials employed and, in particular, on the overall effect desired. Obviously, given the basic inventive idea one skilled in the art will be able to vary his compositions according to the specific materials at hand and the effect he desires.

It is to be understood that the term "emulsion" as used in this specification includes compounded emulsions, for example commercially available emulsion paints may be used as starting materials. Any of the polymer emulsions hitherto known in the art may be used. Such film-forming polymers are derived from one or more ethylenically unsaturated monomers. Typical examples of suitable materials include vinyl acetate homo- and co-polymers, e.g. polyvinyl acetate and vinyl acetate/vinyl chloride co-polymers, pure acrylics e.g. acrylic ester homo- and co-polymers, polystyrene, styrene/butadiene copolymers and acrylonitrile/butadiene copolymers.

In many cases it will be advantageous to add a further film-forming polymer binder to the paints produced by the present invention. The binder is preferably added in an amount of up to 20% by weight based on the total weight of the paint, preferably up to 10%, and may be colourless, or if desired, coloured. The addition of such a binder improves the drying speed, the sheen control, the washability, the durability and the water resistance of the final coating. Any of the film-forming polymers common in the art may be used, e.g. those derived from one or more ethylenically unsaturated monomers provided, of course, that they are resistant to gelling by borax. Especially suitable emulsions are those stabilized by cellulose ether colloids. The further film-forming polymer binder should preferably be made alkaline before incorporation into the paint as the formation of the gel may otherwise be adversely affected.

The paints of the present invention may contain the usual additives such, for example, as extenders, surfactants and fungicides.

The following Examples illustrate the invention but are not intended to limit it thereto. Parts and percentages are by weight.

EXAMPLE 1 a. Preparation of a basic pigmented emulsion

A dispersion of 40 parts titanium dioxide (Tioxide RCR-2) in 60 parts dibutyl phthalate was prepared by high speed mixing.

The dispersion was then added slowly to a polyvinyl alcohol-stabilized emulsion, water being added to dilute the emulsion which became progressively thicker during addition of the dispersion. The white pigmented emulsion obtained comprised:

| | |
|---|---|
| Polyvinyl alcohol stabilized polyvinyl acetate emulsion (Mowilith DHL 50% by weight total solids) | 66.5% |
| $TiO_2$/dibutyl phthalate dispersion | 13.5% |
| Added water | 20% |

The plasticizer content was about 20% by weight based on the total solids content of the pigmented emulsion. The white pigmented emulsion can be used as such or, if required, can be tinted to a desired shade with a water dispersed dyestuff, for example a Colanyl dyestuff. If deep shades are required the titanium dioxide may be replaced by coloured pigments and fillers.

b. Preparation of a paint

A paint was prepared having the following composition

| | | |
|---|---|---|
| Background pigmented emulsion (white) | 25.00 | parts |
| Secondary pigmented emulsion (red) | 7.5 | '' |
| 3% Modocoll E 100 a water-soluble, non-ionic, ethyl-hydroxyethyl cellulose thickener | 18.00 | '' |
| 15% LAPONITE S solution | 6.00 | '' |
| .88 Ammonia | 0.25 | '' |
| 5% Borax solution | 5.00 | '' |
| Water | 38.25 | '' |

It was prepared as follows.

3 parts of the LAPONITE S solution were mixed together with 0.25 parts of 0.88 ammonia, 5 parts of the borax solution and 15 parts of water to form a homogeneous mixture. To this mixture 7.5 parts of the secondary red pigmented emulsion prepared as in (a) above, were added slowly under not too vigorous stirring, care being taken that none of the large gel flecks formed wrapped around the blade of the stirrer.

When addition of the secondary pigmented emulsion had been completed 18 parts of the Modocoll E 100 solution and the remainder of the water were added and mixed until homogeneity had been achieved.

The speed of the stirrer was then raised and the white "background" pigmented emulsion again prepared as in (a) above, was added slowly, stirring being continued until the desired particle size had been reached. The remainder of the LAPONITE S solution was then added.

The resulting paint was diluted to a suitable consistency and spraying onto a test surface and dried to give a film of contracting red flecks on a continuous white background.

If the paint is to be stored for a long period it may be advantageous to add a small amount, for example 1 part, of Zircomplex PN, an organic zirconium complexing agent.

EXAMPLE 2

Three pigmented emulsions coloured red, white and blue respectively were prepared as described in Example 1(a) and were used to form a multicolour paint of the following composition

| | | |
|---|---|---|
| Red pigmented emulsion | 11 | parts |
| White pigmented emulsion | 11 | '' |
| Blue pigmented emulsion | 11 | '' |
| 2% Natrosol HR, hydroxyethyl cellulose thickener | 15 | '' |
| 15% LAPONITE S solution | 6 | '' |
| .88 Ammonia | 0.25 | '' |
| 5% Borax solution | 5 | '' |
| Water | 40.75 | '' |

The paint was prepared as follows.

Half the LAPONITE S solution was mixed with the Natrosol HR solution, the borax solution, the ammonia and half the water to give a homogeneous solution.

When the solution was homogeneous small amounts of the red, white and blue pigmented emulsions were added in turn under medium stirring until addition was complete. Stirring was then continued to give the desired particle size, and finally the remaining LAPONITE S and water were added.

The resulting paint was diluted with water to a suitable consistency and sprayed onto a test surface. The resulting film was three coloured and consisted of a random arrangement of red white and blue flecks.

EXAMPLE 3

This Example illustrates the incorporation of a film-forming polymer emulsion which is resistant to gelling by borax.

Two pigmented emulsions coloured white and blue were prepared as in Example 1(a). The white pigmented emulsion was used to prepared a background colour paint of the following composition.

| | | |
|---|---|---|
| 2% Natrosol 250 HHR solution | 5.00 | parts |
| 15% LAPONITE S solution | 5.00 | " |
| 5% Borax solution | 5.00 | " |
| Mowilith Beta AC 43 (vinyl acetate/butylacrylate copolymer emulsion stabilized with cellulose ether colloid) | 22.00 | " |
| White pigmented emulsion | 40.00 | " |
| Water | 22.75 | " |
| .880 Ammonia | 0.25 | " |
| | 100.00 | |

All items in the formulation except the white pigmented emulsion were mixed together until the mixture was homogeneous. The white pigmented emulsion was then added gradually until a homogeneous gel dispersion was obtained.

The blue flecks were prepared separately to the following composition:

| | | |
|---|---|---|
| 2% Natrosol HHR | 100.00 | parts |
| 5% Borax solution | 10.00 | " |
| Blue pigmented emulsion | 25.00 | " |
| | 135.00 | |

The Natrosol and borax solutions were mixed together until a homogeneous solution was obtained. The blue pigmented emulsion was then added with slow stirring. Stirring was continued until the desired fleck size was achieved.

The dispersion of blue flecks was then added to the background colour paint and mixed slowly until the flecks were uniformly distributed in the white background.

The resulting paint was then sprayed on to a test surface to give a white paint with blue flecks.

EXAMPLE 4

A dispersion of 40 parts titanium dioxide (Tioxide RCR-2) in 60 parts dibutyl phthalate was prepared as in Example 1.

The dispersion was added to a polyvinyl alcohol stabilized emulsion with the addition of water to obtain a workable consistency. The white pigmented emulsion obtained comprised:

| | |
|---|---|
| Polyvinyl alcohol stabilized styrene/acrylic ester copolymer emulsion (Revacryl 309, 55% solids) | 85.00 |
| TiO₂/dibutyl phthalate dispersion | 11.75 |
| Water | 3.25 |
| | 100.00 |

Part of this emulsion was then tinted green with a Colanyl dyestuff. If a deeper shade was required it would, of course, be possible to prepare a separate emulsion utilizing a deep green pigment instead of TiO$_2$.

A multicoloured paint was then prepared to the following composition.

| | |
|---|---|
| White emulsion | 35.00 |
| Green emulsion | 10.00 |
| 5% Borax solution | 5.00 |
| 15% LAPONITE S solution | 5.00 |
| Mowilith VV 264, a film-forming vinyl acetate/versatic ester copolymer emulsion stabilized with a cellulose ether | 25.00 |
| 3% Modocoll E 100 | 7.5 |
| .88 Ammonia | 0.25 |
| Water | 12.25 |
| | 100.00 |

This was prepared as follows.

The borax solution, ammonia, Modocoll E 100 and Mowilith VV 264 were mixed together to form a homogeneous mixture. The LAPONITE S was then added and mixing continued until a smooth dispersion was obtained. The white and green emulsions were added in turn under continuous stirring. Stirring was continued after addition had been completed to obtain a homogeneous dispersion of white and green flecks.

The resulting paint was sprayed onto a test surface and dried to give a film of white paint flecked with green. The film had excellent resistance to water and alkaline solutions.

EXAMPLE 5

A white pigmented emulsion was prepared as in Example 4 to the following composition:

| | |
|---|---|
| Polyvinyl alcohol stabilized vinyl acetate/dibutyl maleate copolymer emulsion (Mowility DMI 51% solids) | 91.5 |
| TiO$_2$/dibutyl phthalate dispersion | 8.5 |
| | 100.00 |

Equal portions of this emulsion were then tinted green and yellow using Colanyl dyestuffs, and a multicoloured paint was prepared to the composition:

| | |
|---|---|
| Yellow emulsion | 25.00 |
| Green emulsion | 25.00 |
| Revacryl 1A, a colloidally stabilized pure acrylic emulsion (butyl acrylate/methyl methacrylate) 51% Solids | 15.00 |
| .88 Ammonia | 0.25 |
| 5% Borax solution | 5.00 |
| 2% Natrosol HHR solution | 4.00 |
| 10% LAPONITE S solution | 7.5 |
| Water | 18.25 |
| | 100.00 |

It was prepared as follows.

The Natrosol 250 HHR solution, borax solution, ammonia, Revacryl 1A and water were mixed to give a homogeneous solution. The LAPONITE S was then added and mixing was continued until a smooth dispersion was obtained. The yellow and green emulsions were then added in turn under continuous stirring which was continued after complete addition in order to obtain a homogeneous dispersion of green and yellow flecks.

The resulting paint was sprayed onto a test surface. The dried film consisting of intermingled but well defined yellow and green flecks had excellent flexibility characteristics.

Control of the particle size is very important. The following factors play a large part.

a. Type and viscosity of the cellulose ether thickener solution.

In general low viscosity solutions produce long strands and the higher the viscosity the smaller the particle size. The size and consistency of the gelled particle is also determined by the particular type of cellulose ether used.

b. Amount of polyvinyl alcohol in the emulsion and the viscosity of the emulsion.

The higher the amount of the polyvinyl alcohol the greater the tendency to form large particles. A high emulsion viscosity also appears to give large particles.

Other factors which contribute to particle size are the rate and manner of addition of the emulsions to the borax-containing thickener solutions. For example, in some cases it may prove advantageous to add each film-forming polymer emulsion to a separate solution of borax to form a single coloured dispersion, the single coloured dispersions so obtained being subsequently mixed to form the final multicoloured paint.

In general, the particle size can be adequately controlled by the adjustment of the stirring speed and the stirring time. The higher the speed and the longer the time the smaller will be the particles. Stirrer design is also an important factor.

In some cases the paints produced, which have a loose thixotropic gel structure, may present storage difficulties.

In such cases it may prove advantageous to incorporate the LAPONITE clay in two stages, a first portion being incorporated into the borax solution prior to mixing in the emulsions and a second portion being incorporated into the paint dispersion formed after mixing. The addition of small amounts of other thixotropic agents, for example, Zircomplex PN or triethanolamine titanate, may bring about even further improvement. The gel strength is increased and syneresis is hindered.

We claim:

1. A process for the production of a multicoloured paint which comprises mixing and gelling (a) two or more differently coloured aqueous film-forming polymer paint emulsions, each of said emulsions containing polyvinyl alcohol as a protective colloid, with (b) an aqueous solution of borax to form a multicoloured paint dispersion comprising discrete coloured aqueous polymer emulsion particles as the disperse phases in an aqueous continuous phase of the borax solution, and adding a clay of the formula

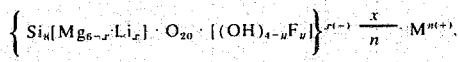

wherein M is a cation, $x$ is a value greater than zero and less than 6, $y$ is from 1.00 up to but less than 4 and $n$ is an integer from 1 to 3, into the continuous phase to stabilize the dispersion produced.

2. The process of claim 1, wherein said clay has the specific dry weight analysis: $SiO_2$ 55.9%, $MgO$ 26.7%, $Li_2O$ 1.9%, F 8.3%, $Na_2O$ 4.3%, $Fe_2O_3$ 0.04%, $CaO$ 0.10%, $SO_3$ 0.05%, $CO_2$ 0.24%, structural $H_2O$ 3.6%.

3. The process of claim 1, wherein the clay is incorporated in two stages, a first portion being incorporated into the borax solution prior to mixing in the emulsions and a second portion being incorporated into the paint dispersion formed after mixing.

4. The process of claim 1, wherein a cellulose ether is also incorporated into the borax solution as a thickener.

5. The process of claim 1, wherein up to 20% by weight, based on the weight of the final paint, of a film-forming polymer emulsion, said polymer being derived from one or more ethylenically unsaturated monomers, is incorporated into the continuous phase as a binder.

6. The process of claim 1, wherein one or each aqueous polymer emulsion has been compounded by the steps of (a) dispersing a dry coloured pigment in a plasticizer and (b) plasticizing the emulsion.

7. The process of claim 1, wherein the or each aqueous polymer emulsion has been compounded by the steps of (a) dispersing $TiO_2$ in a plasticizer, (b) plasticizing the emulsion and (c) tinting the emulsion to the required shade by adding a water-dispersible pigment to the emulsion.

8. The process of claim 1, wherein the film-forming polymer emulsions are added in succession to a single borax solution.

9. The process of claim 1, wherein each film-forming polymer emulsion is added to a solution of borax to form a single coloured dispersion and then the single coloured dispersions so obtained are mixed to form the final multicoloured paint.

10. A multicoloured paint which comprises colouring amounts of discrete gelled particles derived from two differently coloured aqueous film-forming polymer emulsions, each of said emulsions containing polyvinyl alcohol as a protective colloid, dispersed in an outer aqueous phase which contains borax and a clay of the formula

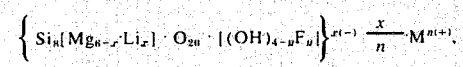

wherein M is a cation, $x$ is a value greater than zero and less than 6, $y$ is from 1.00 up to but less than 4 and $n$ is an integer from 1 to 3, as stabilizer.

11. The multicoloured paint of claim 10, wherein the clay has the specific dry weight analysis: $SiO_2$ 55.9%, $MgO$ 26.7%, $Li_2O$ 1.9%, F 8.3%, $Na_2O$ 4.3%, $Fe_2O_3$ 0.04%, $CaO$ 0.10%, $SO_3$ 0.05%, $CO_2$ 0.24%, structural $H_2O$ 3.6%.

12. The multicoloured paint of claim 10, wherein the outer phase also contains a cellulose ether as thickener.

13. The multicoloured paint of claim 10, wherein the outer phase also contains up to 20%, based on the weight of the paint, of a film-forming polymer emulsion, the polymer being derived from one or more ethylenically unsaturated monomers.

* * * * *